July 26, 1932. C. L. EKSERGIAN 1,868,818
UNIVERSAL JOINT
Filed June 21, 1930
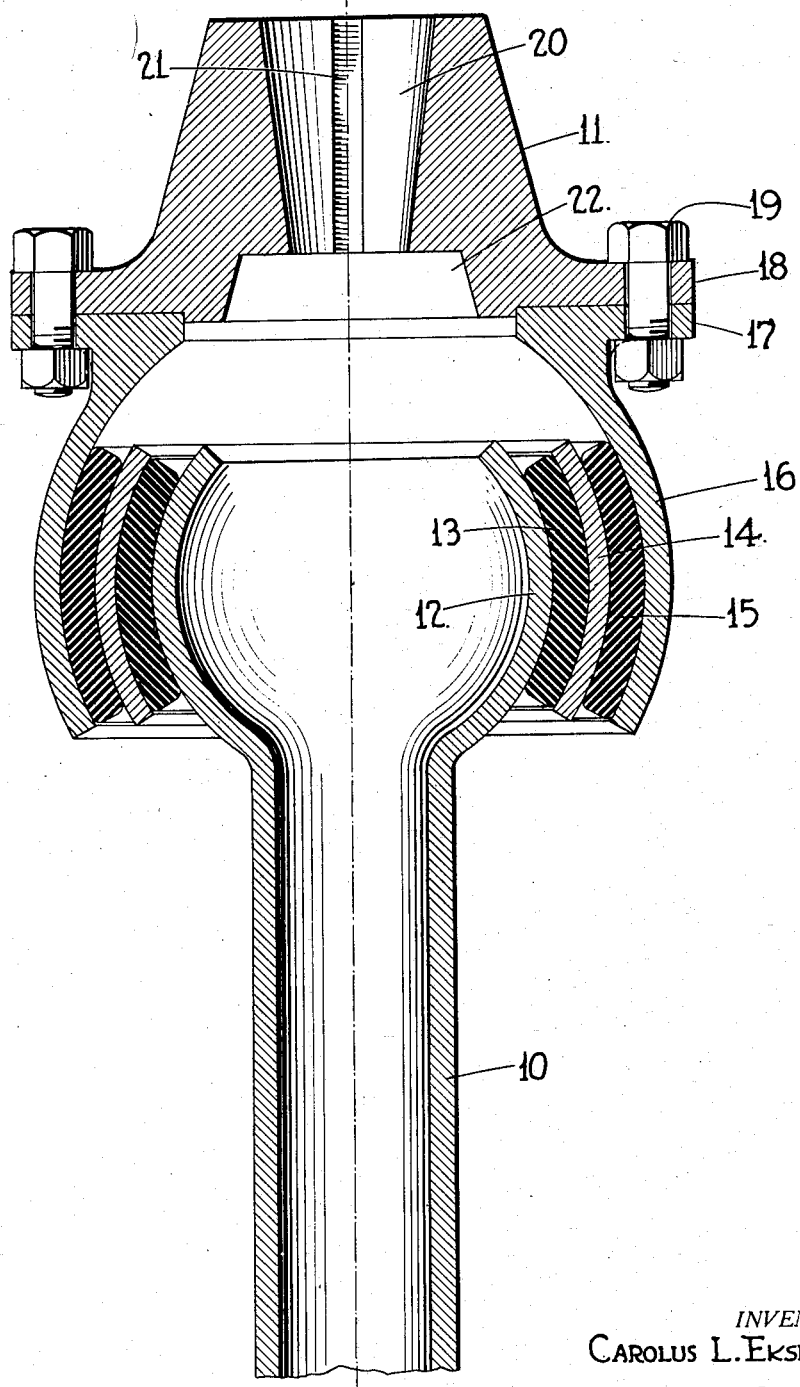
INVENTOR.
CAROLUS L. EKSERGIAN.
BY
ATTORNEY.

Patented July 26, 1932

1,868,818

UNITED STATES PATENT OFFICE

CAROLUS L. EKSERGIAN, OF DETROIT, MICHIGAN, ASSIGNOR TO BUDD WHEEL COMPANY, OF PHILADELPHIA, PENNSYLVANIA, A CORPORATION OF PENNSYLVANIA

UNIVERSAL JOINT

Application filed June 21, 1930. Serial No. 462,725.

My invention relates to the art of universal joints, and it has been my object to provide a joint of this type which is light, strong and inexpensive. It has been a further object to provide a joint which combines the advantages of a universal joint and a flexible coupling whereby to cushion the shocks which would otherwise be transmited to the driven member.

The principal object of my invention has been to provide a joint for the transmission of torque uniformly through a very large angle.

My joint constitutes an improvement on that disclosed in the application of R. H. Rosenberg, application Serial No. 424,519, filed January 30, 1930, and involves the application of the principles thereof. According to that application, a distortable member made of live rubber is interposed between globular driving and driven members to constitute a flexible universal driving connection therebetween. I have improved on that construction by providing a plurality of such distortable members to transmit the driving torque and interposing a metallic torque transmitting sleeve between the respective distortable members. I am thus enabled to obtain a very high degree of angularity and a considerable cushioning effect.

In the drawing:

The single figure is a sectional view through the driving and driven members illustrating their relationship.

The reference characters 10 and 11 denote the driving and driven members. Although either of these members may be the driving and the other the driven member, we will assume that the member 10 is the driving member and the member 11 is the driven element. The member 10 is in the nature of a shaft and it is provided on its end with a globular head 12. This head 12 is associated with a sleeve 13 of distortable material, such as live rubber, which surrounds it. This sleeve 13 is in turn surrounded by a metallic sleeve 14. The sleeve 14 is confined between the sleeve 13 and a second live rubber sleeve 15. The sleeve 15 is in turn surrounded by a globular sleeve 16 which constitutes the driven member of the universal joint. The sleeves 13 and 15 constitute a driving connection between the portion 12 of the driving shaft and the sleeve 14, and the sleeves 14 and 16, respectively. These sleeves, 13 and 15, may be treated in any suitable way in order to render them capable of effecting their driving function. For example, the sleeves may be bonded to their respective driving and driven members by vulcanizing or by means of a suitable adhesive, or they may be distorted in their interposed relationship with these members so as to effect a superior frictional grip between these sleeves and their associated members. A combination of these methods may also be used in which these sleeves are both bonded by suitable means such as vulcanizing and also distorted, or one of the sleeves may be bonded to its associated elements and the other distorted. I prefer, however, to have the members similarly treated so that they will each take a substantially equal portion of the angle between the driving and driven members. Situations may arise, however, in which an unequal distribution of the torque between these members is desirable, and I do not therefore wish to be limited to any particular relationship between the parts.

The driven member 16 is provided with a flange 17 which abuts against a flange 18 on the sleeve 11 which is keyed to the driven shaft by means of a conical opening 20 which receives the driven shaft (not shown) and a key-way 21 which aligns with a similar key-way in the driven shaft to secure the parts in their assembled relationship. This sleeve 11 is also provided with an opening 22 in its end to receive a nut or other suitable means adapted to secure the sleeve on the end of the driven shaft.

The provision of two separate rubber sleeves with an interposed torque transmitting member enables me to secure a very large angle between the driving and driven members, and at the same time, increases to a very measurable extent the flexible coupling feature of the aforesaid Rosenberg application. My joint also insures a uniform angular velocity between the driving and driven members even when the torque is transmitted between these members through an extreme angle. The provision of a multiple unit joint of this type also makes possible a distribution of the angular displacement between the shafts between a plurality of flexible sleeves, and thus makes it possible to use a material of suitable characteristics without undue burden on the life and strength of the material.

While I have shown the driving, driven and intermediate members of concentric shape, I wish it to be understood that this is not essential to my invention, as these members might take various shapes without departing from my inventive concept.

I also wish it to be understood that although I have illustrated my invention in connection with globular elements, the particular shape is also unessential to my invention, as any system of driving, driven and torque transmitting members in which distortable means are interposed between the members, comes within the spirit of my invention. Although I have suggested the use of live rubber as a distortable medium, any other material of suitable characteristics might be used in this connection. Live rubber serves the purpose of my invention particularly well as it is readily distortable but substantially incompressible.

Although I have suggested connecting the distortable elements to their associated parts by bonding or distortion, I wish it to be understood that any suitable means of combining these parts comes within the spirit of my invention.

While I have illustrated a universal joint in which two rubber sleeves are used, it is obvious that any number of these sleeves might be used in a device of this kind, and I therefore wish it to be understood that I contemplate the use of a greater number than two, if found desirable.

I wish it to be further understood that this disclosure is intended in an illustrative rather than a limiting sense.

What I claim is:

1. A shaft coupling comprising a male member, a female member, a torque transmitting member interposed between the male and female members and distortable members interposed between said torque transmitting member and said male and female members respectively, and held in distorted condition therebetween.

2. A shaft coupling comprising a globular driving member, a globular driven member, an intermediate torque transmitting member interposed between said driving and driven members and spaced from each of the said driving and driven members and distortable members interposed between said torque transmitting member and said driving and driven members respectively.

3. A shaft coupling comprising a male member, a female member, a torque transmitting member interposed between the male and female members and distortable members interposed between said torque transmitting member and said male and female members respectively, said distortable members being held under substantially equal mass tension.

In testimony whereof I hereunto affix my signature.

CAROLUS L. EKSERGIAN.